March 22, 1955  R. E. STILWELL  2,704,679
PIVOTED DETECT COUPLING ARRANGEMENT FOR PIPE SECTIONS
Filed May 3, 1952  3 Sheets-Sheet 1
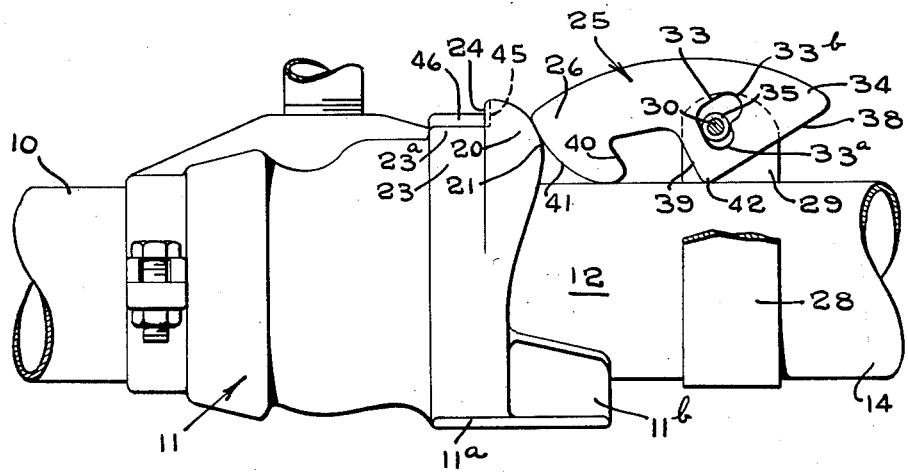
FIG_1
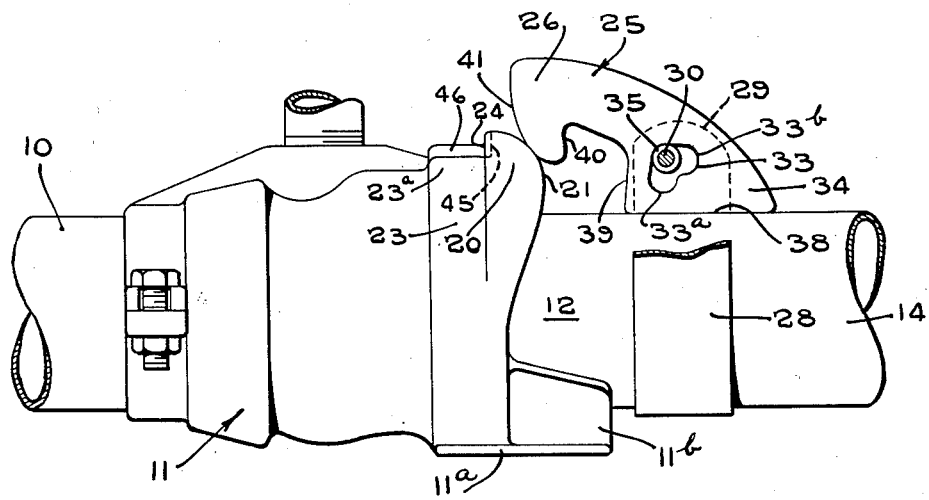
FIG_2
INVENTOR
ROBERT E. STILWELL
BY Hans G. Hoffmeister
ATTORNEY March 22, 1955 R. E. STILWELL 2,704,679
PIVOTED DETECT COUPLING ARRANGEMENT FOR PIPE SECTIONS
Filed May 3, 1952 3 Sheets-Sheet 2
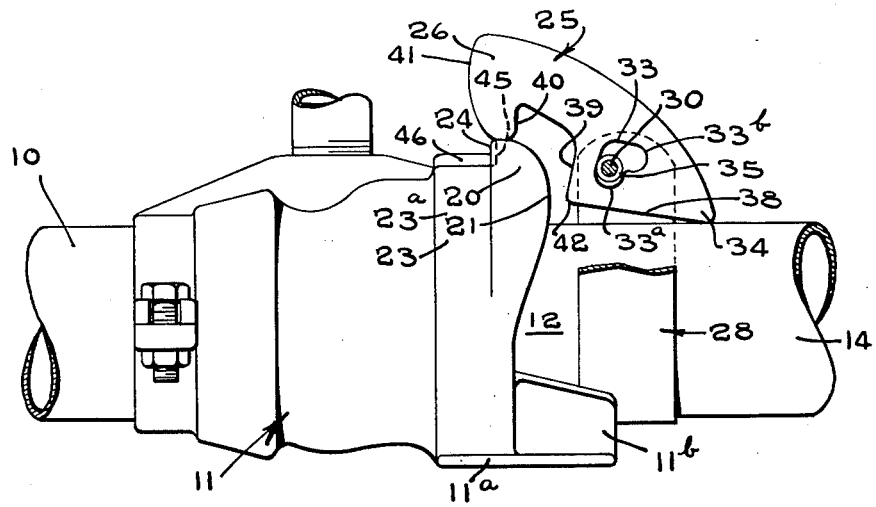
FIG_3
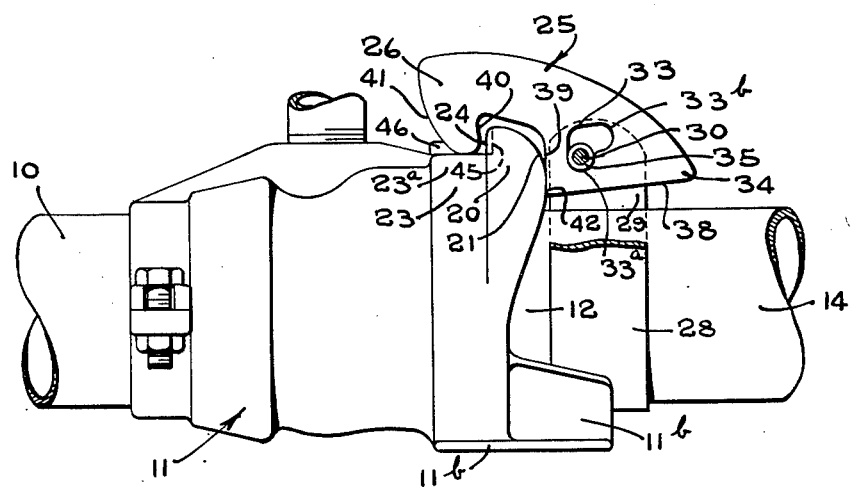
FIG_4
INVENTOR
ROBERT E. STILWELL
BY Hans G. Hoffmeister
ATTORNEY March 22, 1955     R. E. STILWELL     2,704,679
PIVOTED DETECT COUPLING ARRANGEMENT FOR PIPE SECTIONS
Filed May 3, 1952     3 Sheets-Sheet 3
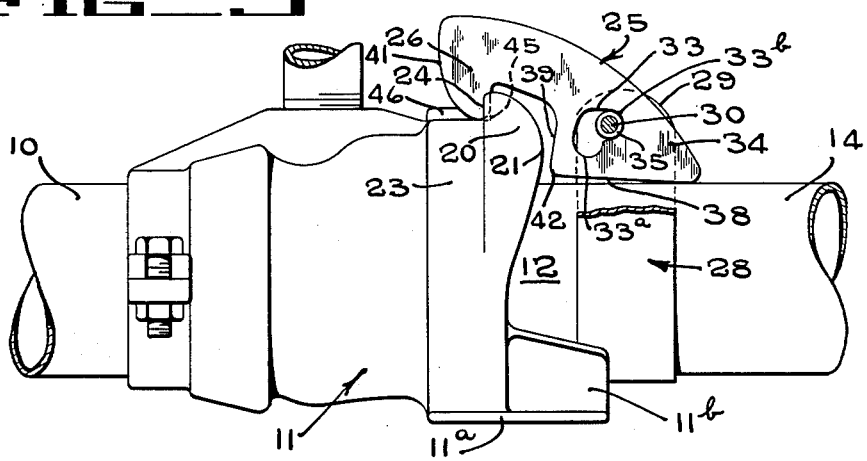
FIG_5
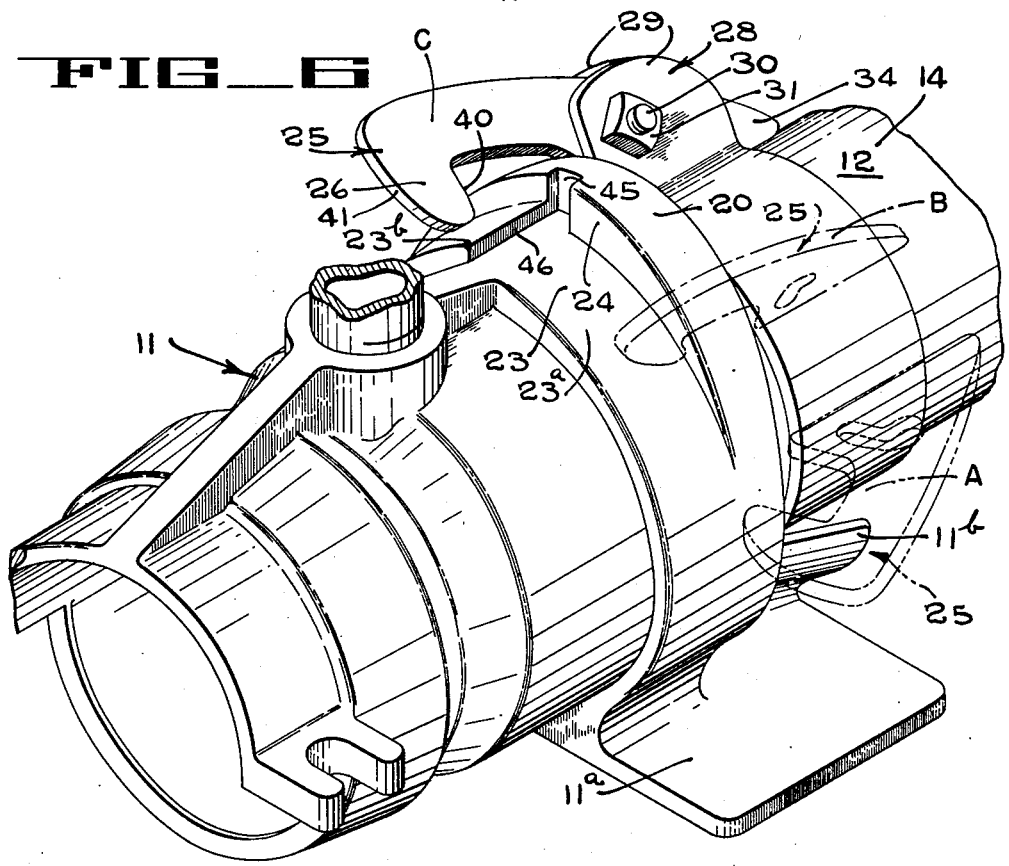
FIG_6
INVENTOR
ROBERT E. STILWELL
BY Hans G. Hoffmeister
ATTORNEY

United States Patent Office 2,704,679
Patented Mar. 22, 1955

2,704,679

PIVOTED DETECT COUPLING ARRANGEMENT FOR PIPE SECTIONS

Robert E. Stilwell, Santa Clara, Calif., assignor to Food Machinery and Chemical Corporation, San Jose, Calif., a corporation of Delaware Application May 3, 1952, Serial No. 285,908

5 Claims. (Cl. 285—170)

The present invention relates to couplings for pipe sections and especially to couplings for the sections of irrigation pipe lines. More particularly the present invention relates to pipe couplings that employ a latch lever which is pivotally supported from one of the pipe sections to be coupled and which is adapted to engage behind a retaining member provided on the adjacent end of the other pipe section. To urge said latch lever into engagement behind the retaining member of the other pipe section and to maintain such engagement during practical use of the coupled pipe sections, it has been customary to employ suitable spring means or to provide special locking members that had to be separately manipulated once engagement of the latch lever with the retaining member was established, to lock the latch lever in its position of engagement.

It is an object of the present invention to provide a coupling arrangement for pipe sections that is simple in construction, easy to manipulate both in engaging and disengaging it, and dependable in performance.

Another object is to provide a coupling arrangement of the type referred to that may readily be engaged and will dependably remain in engaged condition without need for any spring means.

Still another object is to provide a coupling arrangement, of the type referred to, wherein the latch lever will automatically lock itself in its position of engagement with the retaining member, without need to manipulate any special locking members and in fact without requiring the presence of any special locking members whatsoever.

Yet another object is to provide a coupling arrangement, of the type referred to, that will positively resist disengagement, once it is engaged, whether the coupled pipe sections are pushed toward one another or pulled apart.

These and other objects of the present invention will be apparent from the following description of the accompanying drawings which illustrate a preferred embodiment thereof and wherein:

Fig. 1 is a fragmentary side elevation illustrating two pipe sections provided with the coupling arrangement of the present invention, prior to engagement thereof, with certain parts broken away to expose the structure behind said parts.

Figs. 2 and 3 are side elevations similar to Fig. 1 illustrating the two pipe sections in the process of being coupled, with the elements of the coupling arrangement in two consecutive stages of engagement.

Fig. 4 is a side elevation similar to Figs. 1 to 3 illustrating the relative position which the engaged coupling elements assume when the coupled pipe sections are pushed toward each other.

Fig. 5 is a side elevation similar to Figs. 2 to 4 illustrating the relative position which the engaged coupling elements assume when the coupled pipe sections are pulled apart and, Fig. 6 is a fragmentary perspective of the coupling elements in another stage of engagement.

The left one of the pipe sections shown in the drawings which is identified by the reference numeral 10 has clamped to its forward end a tubular coupling member 11 in the form of a collar which is radially expanded as compared with the diameter of the pipe sections, to receive telescopically the adjacent end 12 of the right pipe section 14. Said tubular coupling member 11 may be provided with a suitable foot pad 11a by means of which the coupled pipe sections may rest securely upon the ground, and its front end may be provided with a funnel segment 11b to facilitate insertion of the pipe section 14. Along the upper sector of its outer edge, the coupling member 11 carries an upwardly directed arched lip 20. The front surface of said lip is of convex curvature as shown at 21. At its rear, however, said lip drops abruptly to an annular surface 23 of lesser radius, thus forming a steep latching shoulder 24. Pivotally supported from the end 12 of the other pipe section 14 is a latch lever or dog 25 which has a front portion or hook-shaped head 26 adapted to engage behind, and be securely retained by the latching lip 20. To pivotally support said dog from the pipe section 14, said section may be embraced by a clamping band 28 the outwardly turned ends 29 of which are held together by a transverse pin or bolt 30 that carries a suitable tightening nut 31 on its end (Fig. 6). Intermediately of the ends 29 of band 28 said bolt 30 engages a slot 33 provided in the rear or tail end portion 34 of the latch dog 25. In the preferred embodiment of the invention illustrated in the accompanying drawings, an anti-friction sleeve 35 is arranged around the bolt 30 to provide a bearing for the dog 25 and to act as a spacer between the ends 29 of the clamping band, lest said ends be tightened to an extent where they impair the free rotatability of the dog 25.

The tail portion 34 of the dog 25 expands somewhat in the manner of a trapezoid forming an elongated rectilinear base edge 38 while its front edge 39 extends almost parallel to the inner edge 40 of the hook-shaped latch head 26 at a distance somewhat larger than the width of the retaining lip 20 on coupling member 11 measured from the apex of its convex front surface 21 to the vertical surface of its shoulder 24. The slot 33 in the tail portion 34 of dog 25 is of angular conformation having a declined front portion 33a and a rear portion 33b that adjoins the upper end of said front portion and extends rearwardly therefrom in a direction substantially parallel to the base edge 38 of the dog tail 34 at an altitude about equal to the distance between the transverse pivot bolt 30 and the peripheral surface of pipe section 14.

When the pipe sections 10 and 14 are to be connected, the end of pipe section 14 is inserted into the open end of the tubular coupling member 11 without regard to the rotary position of the latch dog 25 on its pivot 30—35. Even though said latch dog 25 may be in the extreme forwardly declined position illustrated in Fig. 1, the curved outer edge 41 of its head 26 will always come against, and be cammed upwards by, the convex outer surface 21 of the lip 20. This turns the dog in clockwise direction as viewed in Figures 1 and 2 and also lifts it within the forwardly declined leg 33a of the guide slot 33 relative to its pivot 30—35 until its hook is raised above the latching lip 20 as illustrated in Figs. 2 and 3. Upon further movement of pipe section 14 into coupling member 11, said hook negotiates the crest of lip 20 and as soon as it lies behind the rear surface thereof, the corner point 42 of dog tail 34, formed by the forward edge 39 and the base edge 38 of said tail comes against the convex front surface 21 of the lip 20 at the crest point thereof. Then, as the pipe section 14 is urged further into the coupling member 11, the defined contact between surface 21 and corner point 42 imparts a counterclockwise moment to the dog 25 due to the fact that said corner point 42 lies below the pivot 30 and said pivot in turn is at this moment positioned in the forwardly declined leg 33a of the guide slot 33 below the level of the horizontal rear leg 33b thereof. Hence, the latch dog is now turned in counterclockwise direction about its pivot 30—35, and the hook-shaped head of the dog is thus positively forced to drop into engagement behind the lip 20, with the base edge 38 of the dog tail 34 raised somewhat above the outer surface of pipe section 14 as illustrated in Fig. 4. Hence, latching engagement between dog 25 and lip 20 is positively established without the aid of any spring means whatsoever and without need to manually depress the dog.

After the dog has dropped or cammed down into engagement behind the lip 20 and any force urging the pipe section 14 into coupling members 11 has been removed, the latch dog drops as allowed by the forwardly declined leg 33a of the guide slot 33 until the pivot is positioned approximately at the juncture point of the two slot portions with the base edge 38 of the dog tail resting usually in a slightly inclined position upon the outer surface of tube section 14. If any force should thereafter be applied to pull the coupled pipe sections apart as may be the case when water rushes through the pipe line during practical use thereof, the coupled pipe sections may first move apart over a limited distance until the dog pivot which is guided within the horizontal leg 33b of the slot 33 comes against the rear edge thereof whereupon any further withdrawal of pipe section 14 from the coupling member 11 is blocked. With the pivot bolt 30 thus fully within the rear leg 33b of guide slot 33 and the horizontal base edge 38 of the dog tail 34 bearing against the outer surface of pipe section 14 (Fig. 5), the dog is positively blocked from swinging in clockwise direction and is thus unable to disengage its hook 26 from the retaining lip 20. Thus, no matter in which direction force may be applied to the coupled pipe sections longitudinally thereof, such force is unable to separate the pipe sections but is in fact effective to establish a positive lock between the coupled pipe sections. Therefore, the pipe sections once coupled will at no time be accidentally separated.

In order that the coupled pipe sections may be disconnected, if desired, the latch retaining lip 20 on the coupling member 11 may be arranged to flatten out over an arc of about 60° at either side of its apex to the level of the hereinbefore mentioned annular surface 23 (Fig. 6). Thus, after turning the coupled pipe sections relative to one another until the hook shaped dog head 26 contacts the coupling member 11 at a point where the lip 20 has completely disappeared, as indicated in phantom lines at A in Fig. 6, the pipe sections may be separated without any difficulty. In order to prevent unintentional disconnection of the coupled pipe sections, however, such as might occur if the pipe sections were accidentally twisted relative to each other, a recess or notch 45 adapted to receive the inner edge 40 of the dog head 26 is provided in the latching shoulder 24 at the apex point of lip 20 as best seen in Fig. 6. To guide the latch head 26 dependably into alignment with said recess and thus facilitate proper engagement of the described coupling arrangement, a longitudinal step or abutment 46 may be formed in the hereinbefore described annular surface 23 adjacent to and in longitudinal alignment with one side wall of the recess 45, by arranging said surface in such a manner that it forms actually one convolution of spiral. Thus, whenever the latch head 26 engages behind the lip 20 at a point above the deeper sector 23a of surface 23 as shown at B in phantom lines in Fig. 6, the pipe section 14 is merely turned relative to the coupling member 11 until the hook shaped end of the dog head strikes against the step 46 whereupon it is properly aligned with, and will enter the recess 45 as soon as the coupled pipe sections are pulled apart. On the other hand, when the latch head is engaged over the retaining lip at a point above the higher sector 23b of the annular surface 23, as illustrated in full lines at C in Fig. 6, the pipe section 14 is turned relative to the coupling member 11 until the hook-shaped latch head drops from the step 46 onto the lower sector 23a of the annular surface 23 (position B), whereupon the direction of movement of pipe section 14 is reversed until the latch head strikes against said step 46 and proper alignment of the latch head and the retaining recess is established. Thus, it is possible to insure proper engagement of the dog head in the retaining recess of the lip 20 in an exceedingly simple and convenient manner.

The described coupling mechanism is easy to manipulate and engagement of its latch dog over the retaining lip will occur automatically as the pipe sections are telescoped into one another, no matter in what rotary position the latch dog may be initially and irrespective of whether the pipe sections to be coupled may be in proper coaxial alignment or happen to be tilted relative to one another. There is no need to depress the latch dog manually although the coupling arrangement of the invention employs no spring means of any kind. During practical use of the coupled pipe sections it is impossible for them to become accidentally disengaged, whether they are forced against each other or, as is more likely to happen, are pulled apart; yet whenever it is desired to disconnect the pipe sections, this may readily be done by turning them relative to one another at an angle of 60° whereupon they may be readily separated.

While I have described my invention with the aid of a particular embodiment thereof, it will be understood that I do not wish to be limited to the specific constructional details illustrated and described which may be departed from without departing from the scope and spirit of the present invention.

I claim:

1. Means for coupling two pipe sections comprising a radially projecting latching shoulder on one pipe section and a latch member loosely pivoted on an ear member on the other pipe section, said latch member having a forwardly extending depending hook spaced from a depending tail portion, said tail portion having a forward cam edge for cooperation with said shoulder to force said hook into locking engagement therewith when said pipe sections are longitudinally moved together, said lever tail portion having a bottom edge movable into substantial engagement with said other pipe section, the loose pivotal connection between said latch member and said other pipe section comprising a slot in one of said members having a substantially vertical portion merging into a rearwardly extending substantially horizontal portion and a pivot pin in the other of said members extending transversely through said slot, said pivot pin when in said rearwardly extending slot portion being substantially forward of the rear end of said bottom edge, thereby cooperating with said bottom edge and said other pipe section to hold said hook against movement out of locking engagement with said latching shoulder.

2. The combination as recited in claim 1 wherein said slot is in said latch member and wherein said vertical slot portion extends downwardly from said horizontal slot portion, whereby when said pipe sections are moved together said pivot pin is disposed in the vertical portion of said slot.

3. The combination recited in claim 1 wherein said latching shoulder is provided with a recess having an end wall and opposed side walls with a longitudinally extending step aligned with one of said walls to permit rotation of said shoulder engaged lever hook into registry with said recess and thereafter into locking engagement therewith by a longitudinal retraction of said pipe sections, thereby preventing said lever hook from being moved out of pipe locking engagement with said latching shoulder solely by relative rotation of said pipe sections.

4. The combination as recited in claim 1 wherein said radially projecting latching shoulder is of arcuate shape merging at its opposite ends into the peripheral contour of said one pipe section, whereby said shoulder engaged lever hook may be moved out of registry with said shoulder by a partial relative rotation of said coupled pipe sections to permit disassembly of the latter.

5. A coupling arrangement for pipe sections comprising in combination a tubular coupling member adapted at one of its ends to be secured to the end of a first one of the pipe sections and having a latching lip provided along its other end, said lip having a front face forming a convex camming surface and a rear face forming a latching shoulder and being arranged to flatten out angularly of said tubular coupling member to the level of the adjacent outer surface thereof, a pivot, means mounting said pivot on the second one of the pipe sections transversely of and a predetermined distance above the peripheral surface thereof, and a latch dog having a hook-shaped head and a tail forming an elongated longitudinal base edge and containing an angular guide slot, said latch dog being engaged with its angular slot over said pivot such that its hook-shaped head extends forwardly in the direction of said lip and its tail lies above the peripheral surface of the second pipe section, said slot having a forwardly declined first leg and a second leg extending rearwardly from the upper end of said first leg substantially parallel to the base edge of said tail at a distance from said base edge substantially equal to the distance between the pivot and the peripheral surface of the second pipe section.

References Cited in the file of this patent

UNITED STATES PATENTS

| | | |
|---|---|---|
| 32,464 | Bunnell | June 4, 1861 |
| 971,498 | Eytalis | Sept. 27, 1910 |
| 1,542,335 | Cardarelli | June 16, 1925 |
| 1,569,028 | Post | Jan. 12, 1926 |
| 1,629,641 | Schlafly | May 24, 1927 |
| 1,910,706 | Malzard | May 23, 1933 |
| 2,339,537 | Wise | Jan. 18, 1944 |
| 2,464,466 | Stout | Mar. 15, 1949 |
| 2,499,476 | Eyerly | Mar. 7, 1950 |

FOREIGN PATENTS

| | | |
|---|---|---|
| 20,941 | Denmark | Jan. 24, 1916 |